United States Patent
Burrow et al.

(10) Patent No.: US 8,533,092 B1
(45) Date of Patent: Sep. 10, 2013

(54) FINANCIAL EVALUATION PROCESS

(75) Inventors: Jeffrey Burrow, Turlock, CA (US);
Jason Gordo, Riverbank, CA (US)

(73) Assignee: Fat Donkey, Inc., Modesto, CA (US)

( * ) Notice: Subject to any disclaimer, the term of this patent is extended or adjusted under 35 U.S.C. 154(b) by 0 days.

(21) Appl. No.: 13/436,426

(22) Filed: Mar. 30, 2012

Related U.S. Application Data

(60) Provisional application No. 61/470,251, filed on Mar. 31, 2011.

(51) Int. Cl.
*G06Q 40/00* (2012.01)

(52) U.S. Cl.
USPC ............................. 705/36 R; 705/35; 705/37

(58) Field of Classification Search
USPC .......................................................... 705/35
See application file for complete search history.

(56) References Cited

U.S. PATENT DOCUMENTS

| | | | | |
|---|---|---|---|---|
| 6,012,043 | A * | 1/2000 | Albright et al. | 705/36 R |
| 6,064,984 | A * | 5/2000 | Ferguson et al. | 705/36 R |
| 6,859,788 | B1 * | 2/2005 | Davey | 705/36 R |
| 7,249,080 | B1 * | 7/2007 | Hoffman et al. | 705/36 R |
| 7,509,279 | B2 * | 3/2009 | Chhabra et al. | 705/36 R |
| 7,577,597 | B1 * | 8/2009 | Allison et al. | 705/35 |
| 7,870,051 | B1 * | 1/2011 | En et al. | 705/36 R |
| 7,877,308 | B1 * | 1/2011 | Padgette et al. | 705/35 |
| 7,895,102 | B1 * | 2/2011 | Wilks et al. | 705/35 |
| 7,899,750 | B1 * | 3/2011 | Klieman et al. | 705/40 |
| 8,078,524 | B2 * | 12/2011 | Crawford et al. | 705/38 |
| 2001/0032156 | A1 * | 10/2001 | Candura et al. | 705/36 |
| 2002/0013754 | A1 * | 1/2002 | Frank et al. | 705/36 |
| 2002/0073005 | A1 * | 6/2002 | Welnicki et al. | 705/35 |
| 2002/0111890 | A1 * | 8/2002 | Sloan et al. | 705/36 |
| 2002/0123949 | A1 * | 9/2002 | VanLeeuwen | 705/35 |
| 2002/0143680 | A1 * | 10/2002 | Walters et al. | 705/36 |
| 2002/0169702 | A1 * | 11/2002 | Eaton et al. | 705/36 |
| 2002/0188536 | A1 * | 12/2002 | Milosavljevic et al. | 705/35 |
| 2003/0023544 | A1 * | 1/2003 | Chodes | 705/38 |
| 2003/0144936 | A1 * | 7/2003 | Sloan et al. | 705/36 |
| 2004/0054610 | A1 * | 3/2004 | Amstutz et al. | 705/36 |
| 2005/0010510 | A1 * | 1/2005 | Brose et al. | 705/35 |
| 2005/0144108 | A1 * | 6/2005 | Loeper | 705/36 |
| 2006/0010053 | A1 * | 1/2006 | Farrow | 705/35 |
| 2006/0020530 | A1 * | 1/2006 | Hsu et al. | 705/35 |
| 2006/0020533 | A1 * | 1/2006 | Lee | 705/35 |
| 2006/0031158 | A1 * | 2/2006 | Orman | 705/38 |

(Continued)

FOREIGN PATENT DOCUMENTS

WO WO 2010048336 A1 * 4/2010

OTHER PUBLICATIONS

Ross Levin, The Wealth Management Index, The Financial Advisor's System for Assessing & Managing Your Client's Plans & Goals, 1997, pp. 1-216.

*Primary Examiner* — Gregory Johnson
(74) *Attorney, Agent, or Firm* — Van Pelt, Yi & James LLP

(57) ABSTRACT

Quantitatively improving a financial evaluation is disclosed. A plurality of factor scores based on a plurality of factors is determined. A total score is calculated based on the plurality of factor scores. A plurality of actions is identified that will influence at least a portion of the plurality of factor scores. The actions are ranked based on their total impact on the plurality of factor scores. A most important action of the plurality of actions to improve the total score is determined.

20 Claims, 6 Drawing Sheets

(56) References Cited

U.S. PATENT DOCUMENTS

| | | | |
|---|---|---|---|
| 2006/0041491 A1* | 2/2006 | Smith et al. | 705/35 |
| 2006/0074788 A1* | 4/2006 | Grizack et al. | 705/35 |
| 2007/0011071 A1* | 1/2007 | Cuscovitch et al. | 705/35 |
| 2007/0027736 A1* | 2/2007 | Reynolds et al. | 705/8 |
| 2007/0043642 A1* | 2/2007 | Smith et al. | 705/36 R |
| 2007/0083455 A1* | 4/2007 | Bove et al. | 705/36 T |
| 2007/0156559 A1* | 7/2007 | Wolzenski et al. | 705/35 |
| 2007/0174163 A1* | 7/2007 | Griffin | 705/35 |
| 2007/0250427 A1* | 10/2007 | Robinson | 705/36 R |
| 2008/0033871 A1* | 2/2008 | Birbara et al. | 705/39 |
| 2008/0147567 A1* | 6/2008 | Perry et al. | 705/36 R |
| 2008/0249925 A1* | 10/2008 | Nazari et al. | 705/38 |
| 2009/0030740 A1* | 1/2009 | Robinson | 705/4 |
| 2009/0048957 A1* | 2/2009 | Celano | 705/35 |
| 2009/0070275 A1* | 3/2009 | Frank et al. | 705/36 T |
| 2009/0192947 A1* | 7/2009 | Kenigsberg et al. | 705/36 R |
| 2010/0009320 A1* | 1/2010 | Wilkelis | 434/109 |
| 2010/0076908 A1* | 3/2010 | Frank | 705/36 T |
| 2010/0082501 A1* | 4/2010 | Loeper | 705/36 R |
| 2010/0100470 A1* | 4/2010 | Buchanan et al. | 705/35 |
| 2010/0198750 A1* | 8/2010 | Ron et al. | 705/36 T |
| 2010/0211528 A1* | 8/2010 | Loeper | 705/36 R |
| 2010/0250421 A1* | 9/2010 | Ariff et al. | 705/35 |
| 2010/0262526 A1* | 10/2010 | Johnson | 705/35 |
| 2010/0268666 A1* | 10/2010 | Smith et al. | 705/36 R |
| 2010/0280935 A1* | 11/2010 | Fellowes et al. | 705/35 |
| 2010/0306126 A1* | 12/2010 | Moran et al. | 705/36 R |
| 2010/0306127 A1* | 12/2010 | Weinberger et al. | 705/36 R |
| 2011/0087622 A1* | 4/2011 | Padgette et al. | 705/36 R |
| 2011/0112985 A1* | 5/2011 | Kocmond | 705/36 R |
| 2011/0225079 A1* | 9/2011 | Davidson | 705/35 |
| 2011/0251978 A1* | 10/2011 | Davies et al. | 705/36 R |
| 2012/0069131 A1* | 3/2012 | Abelow | 348/14.01 |
| 2012/0089535 A1* | 4/2012 | Hebela | 705/36 R |
| 2012/0221420 A1* | 8/2012 | Ross | 705/16 |

* cited by examiner

FINANCIAL EVALUATION PROCESS

CROSS-REFERENCE TO OTHER APPLICATIONS

This application claims priority to U.S. Provisional Patent Application No. 61/470,251 entitled WEALTH MEASUREMENT PROCESS filed Mar. 31, 2011 which is incorporated herein by reference for all purposes.

BACKGROUND OF THE INVENTION

It is difficult for an individual to accurately assess his or her financial stability, position and health. Not only is it difficult for an individual to determine the complex set of factors that goes into assessing an individual's finances, it is even more difficult to determine how to assess each factor and combine each factor to determine an overall assessment. Even if an individual was able to assess one's financial health, the individual faces the challenge of determining how to improve and/or maintain one's financial health. Traditionally financial planners and advisors have fulfilled these needs. However, not all individuals have the time or resources to access a financial planner. Additionally, there does not exist a single authoritative standard on the methods financial planners use to assess a client's finances, and the client is unable to determine whether a reliable method is being used to assess the client. Therefore, there exists a need for a better way to assess the financial stability, position and health of an individual.

BRIEF DESCRIPTION OF THE DRAWINGS

Various embodiments of the invention are disclosed in the following detailed description and the accompanying drawings.

DETAILED DESCRIPTION

Figure 1:
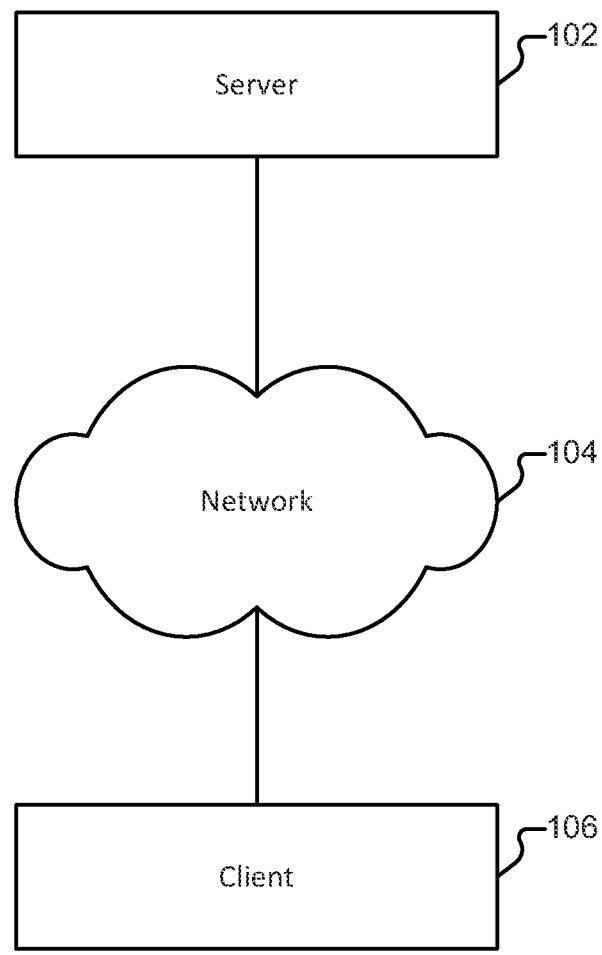
FIG. 1 is a block diagram illustrating an embodiment of a system for determining a financial evaluation score.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A financial evaluation process is disclosed. In some embodiments, a financial evaluation score is determined based on a plurality of factor scores. A factor score is determined for one or more factors, such as factors in financial goal setting, a financial evaluation, investments, liabilities, protection planning, retirement planning, liquidity/cash flow, estate planning, tax, and financial ratios, among others. For example, an individual answers questions and/or provides financial information regarding a plurality of factors and the responses/information provided by the individual are used to generate a financial evaluation score.

Using the financial evaluation score, individuals may be able to reliably assess the financial "health" of the individual. For example, the relative value of the financial evaluation score will help an individual answer questions such as: "Am I on track to meet my financial goals (retirement, income, etc.)?"; "How secure is my financial future?"; "Am I doing the right things financially?"; and "What is my progress towards establishing a financial plan?"

In some embodiments, the financial evaluation score is based on the individual goals. For example, the financial evaluation score is correlated with how close the individual is to achieving the individual's identified financial goal(s). For example, a high financial evaluation score is associated with an individual that is close to achieving the individual's financial goal(s) and future financial security, whereas a low financial evaluation score is associated with an individual that is not very close to achieving the individual's financial goals and future financial security. In some embodiments, the score is comparable against other individuals with similar goal(s), demographics, and/or financial position to determine the financial "progress" of the individual as compared to other similar individuals. In some embodiments, the financial evaluation score includes components that at least in part measure the subject's progress towards establishing a financial plan. In some embodiments, the financial evaluation score at least in part measures the knowledge and/or received education of a subject with respect to information and/or considerations associated with financial planning.

In some embodiments, a user is able to improve and/or maintain the user's financial "health" by identifying ways to improve and/or maintain the user's financial evaluation score. For example, by analyzing potential changes to the financial evaluation score, a user is able to assess the impact of financial actions/inactions on the ability of the individual to achieve the user's financial goal(s). In some embodiments, a plurality of actions that will influence the financial evaluation score is determined and ranked based on their total impact on the financial evaluation score. For example, actions (e.g., increase liquidity, purchase insurance, investment decisions, etc.) to improve an individual's financial evaluation score are suggested to a user. The actions are provided to the user in an order based on the potential impact of the action on the individual's financial evaluation score. In another example, a user may specify a desired financial action/result (e.g., purchase a new car) and its impact on the user's financial evaluation score is provided to the user along with alternative actions (e.g., no action, buy used car, lease car, etc.) and their impact on the user's financial evaluation score are provided. In some embodiments, the action option(s) to be considered for a user and/or the action(s) recommended to the user are determined based in part on information provided by a user in order to determine the user's financial evaluation score. For example, a subset of a list of possible actions is determined to be possibly applicable to the user based on the user provided information, and each action of the subset is analyzed to determine its impact on the user's financial evaluation score.

In some embodiments, a list of recommended investment options are provided to a user based at least in part on the user's financial evaluation score and/or information provided by the user. For example, at least a portion of the investment options available on the user's retirement account are ordered by its potential impact on the user's financial evaluation score. Using this potential impact and a provided risk profile of the user, one or more of the investment options are recommended to the user.

FIG. 1 is a block diagram illustrating an embodiment of a system for determining a financial evaluation score. Server 102 is connected to client 106 via network 104. In some embodiments, client 106 accesses data and/or services provided by server 102 and provides information to server 102 via network 104. For example a user utilizes client 106 to access an internet website at least in part provided by server 102. The internet website enables the user to provide information required to determine a financial evaluation score for the user. The website may also provide to client 106 tools, referrals and information for a user of client 106 to improve and/or maintain the financial evaluation score. Any number of servers and clients may be connected to network 104. Client 106 may access a plurality of servers connected to network 104 to provide and/or obtain information related to a financial evaluation score. Any number of clients may access one or more servers, such as server 102, via network 104, to determine and/or interact with a financial evaluation score. In various embodiments, server 102 is connected to a storage, such as a database, that stores information associated with financial record(s) (e.g., user provided information, financial evaluation score(s), educational information, actions to improve a financial evaluation score, financial metrics, etc.) of one or more users. In some embodiments, server 102 obtains information about a user from another server connected to network 104 to determine a financial score. For example, server 102 accesses a bank server to automatically obtain financial information associated with a user. In some embodiments, client 106 is associated with a financial advisor, and the financial advisor provides financial information associated with an individual client of the financial advisor to server 102 via client 106. Network 104 may include one or more of the following: a direct or indirect physical communication connection, mobile communication network, Internet, intranet, Local Area Network, Wide Area Network, Storage Area Network, and any other forms of connecting two or more systems or storage devices together.

Figure 2:
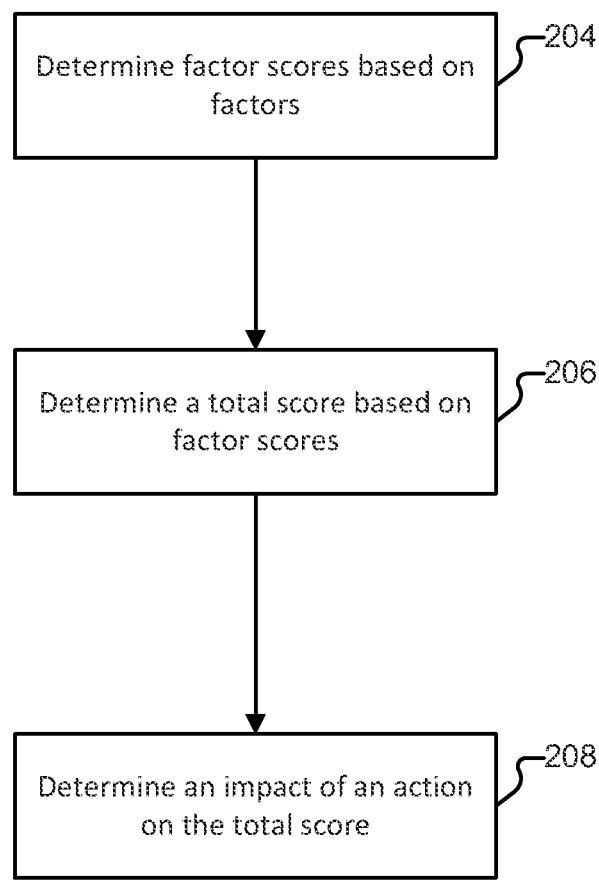
FIG. 2 is a flow chart illustrating an embodiment of a process for determining a financial evaluation score.

FIG. 2 is a flow chart illustrating an embodiment of a process for determining a financial evaluation score. In some embodiments, the process of FIG. 2 is at least in part performed by server 102 of FIG. 1. At 204, factor scores are determined based on factors. In some embodiments, factor scores are determined for each component of information about a subject used to determine a financial evaluation score. In some embodiments, determining the factor scores at 204 includes determining a score for each set of information used to evaluate a financial position of an individual. For example, a score is determined for each and/or group of questions, answers, financial information, financial metric, and/or financial ratio received or determined for the subject to be scored. In some embodiments, a factor score is determined at least in part by adding a plurality of sub scores. In some embodiments, a factor score is determined at least in part by scaling an intermediate score by a discounting/weighing factor value. In some embodiments, a factor score is a negative value (e.g., a factor score based on expense to income ratio). In some embodiments, a factor score indicates knowledge and/or consideration of information and/or strategy associated with a factor. For example, a user's financial evaluation score can be improved by learning about financial planning factors.

At 206, a total score is determined based on the factor scores determined at 204. In some embodiments, determining the total score includes adding, averaging, scaling, multiplying, dividing, discounting, subtracting, weighing, and/or otherwise statistically processing at least a portion of the factor scores to determine the total score. For example, the total score is a sum of all of the factor scores. In various embodiments, the total score determined in 206 is the financial evaluation score discussed throughout the specification and/or can be used as a metric of a financial planning of an individual.

In some embodiments, the factor score and/or the total score is decayed (e.g., reduced by a predetermined value or percentage after each predetermined time period) based on a time value (e.g., a factor score is reduced over time). For example, although a subject may obtain the maximum factor score for a factor associated with having knowledge of the subject's current credit score, this factor score will be reduced by a predetermined value every 3 months. Thus in order to maintain the maximum factor score for this factor, the subject needs to revisit the subject's credit history/score every 3 months. In some embodiments, a factor score associated with whether a subject has knowledge on a particular topic is decayed based on a time since knowledge was acquired to signify that the knowledge must be refreshed periodically.

At 208, an impact of an action on the total score is determined. In some embodiments, determining the impact at 208 includes determining a new total score due to an action or considered action of a subject. For example, a difference in the total score of a subject if the subject obtains a recommend life insurance is determined at 208 and provided to a user. In some embodiments, the action of 208 is determined from a set of possible actions that an individual could perform to possibly improve and/or maintain the subject's total score. For example, for each action in a group of possible actions to improve the subject's total score, the score impact of the action on the total score is determined. In some embodiments, the action is associated with a desired action indicated by an individual. For example, an individual desires to purchase a home and the impact of purchasing the home on the individual's total score is determined at 208. In some embodiments, the action of 208 is an action that is an alternative action (e.g., purchase a house of less value, rent instead of purchasing a home, etc.) to a desired action of an individual scored at 206 in order to provide possible alternative actions that may be more beneficial to a financial position of the individual.

Figure 3:
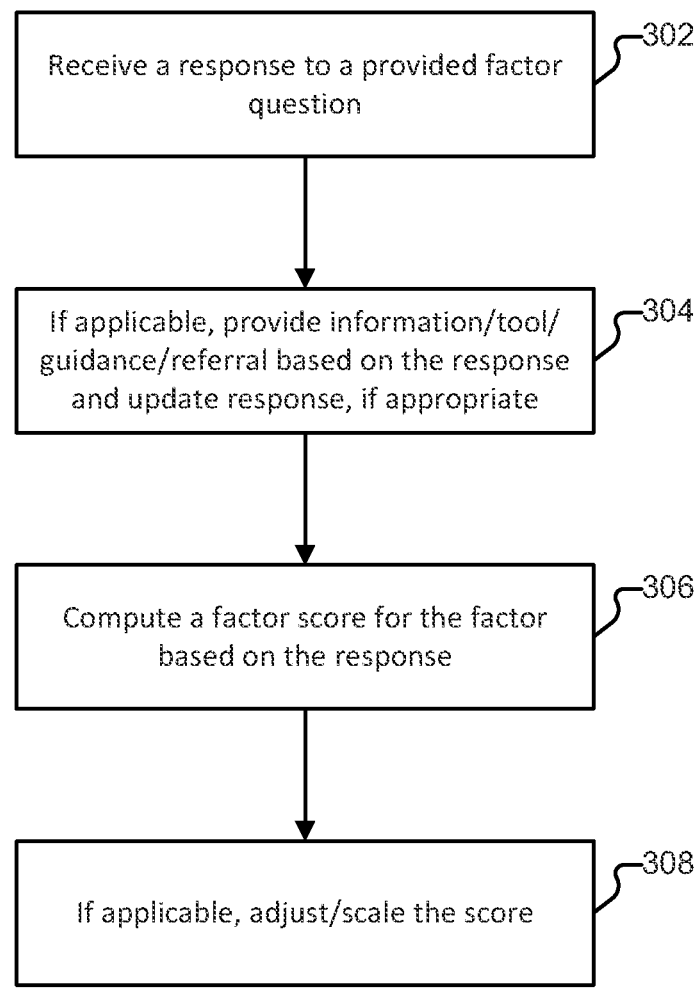
FIG. 3 is a flow chart illustrating an embodiment of a process for determining a factor score.

FIG. 3 is a flow chart illustrating an embodiment of a process for determining a factor score. In some embodiments, at least a portion of the process of FIG. 3 is included in 204 of FIG. 2. For example, at least a portion of the process of FIG. 3 is used to determine one or more factor scores for the associated factor(s) in 204 of FIG. 2. In some embodiments, the process of FIG. 3 is at least in part performed by server 102 of FIG. 1. At 302, a response to a provided factor question is received. In some embodiments, the factor question includes a request for information of a subject desiring to obtain a financial evaluation score. For example, an individual selects a response on a website for a provided question regarding whether the individual has established a retirement savings account.

At 304, information, tool(s), guidance and/or referral(s), if applicable, are provided based on the response and the response is updated, if appropriate. In some embodiments, the information, tool(s), guidance and/or referral(s) are provided to a subject being scored if the response received at 302 indicates an opportunity for the individual to improve the individual's factor score and/or total score of FIG. 2 using the information/tool/guidance/referral. In one example, if the response indicates that the individual has not sufficiently defined a financial goal, a guidance on considerations that go into establishing a goal is provided to enable the individual to establish a financial goal. In another example, if the response indicates that an individual is not aware of financial information of the individual, a referral to a source where the information can be obtained (e.g., website link) or a person/service who can help obtain the information is provided to assist the individual in obtaining the information. In another example, if the response indicates that the individual is not aware of financial options that are available to the individual (e.g., investment strategies, types of available insurance), educational materials (e.g., reading material, video, and audio) are provided to educate the individual. In another example, if the response indicates that the individual cannot figure out a desired retirement age, a tool is provided to help the individual calculate the optimal retirement age.

At 306, a factor score is computed based on the response. In some embodiments, computing the factor score includes using a predetermined score value associated with the response. In some embodiments, computing the factor score includes using a value associated with the response in a formula to determine the factor score. At 308, the factor score is adjusted and/or scaled, if applicable. In some embodiments, the factor score is scaled using a scaling multiplier (e.g., a discount/weighing factor value) determined based on financial information and/or financial actions of the subject being scored. For example an intermediate score based on whether a subject has knowledge of a particular topic is discounted by a value associated with a financial status and/or action of the subject to signify that certain points for knowledge should only be credited if associated actions/values can be demonstrated. In some embodiments, the factor score in 308 is one of a plurality of factor scores adjusted using an adjustment value. For example, the factor score is added to one or more other factor scores to determine a group score before adjusting the group score using an adjustment value.

Figure 4:
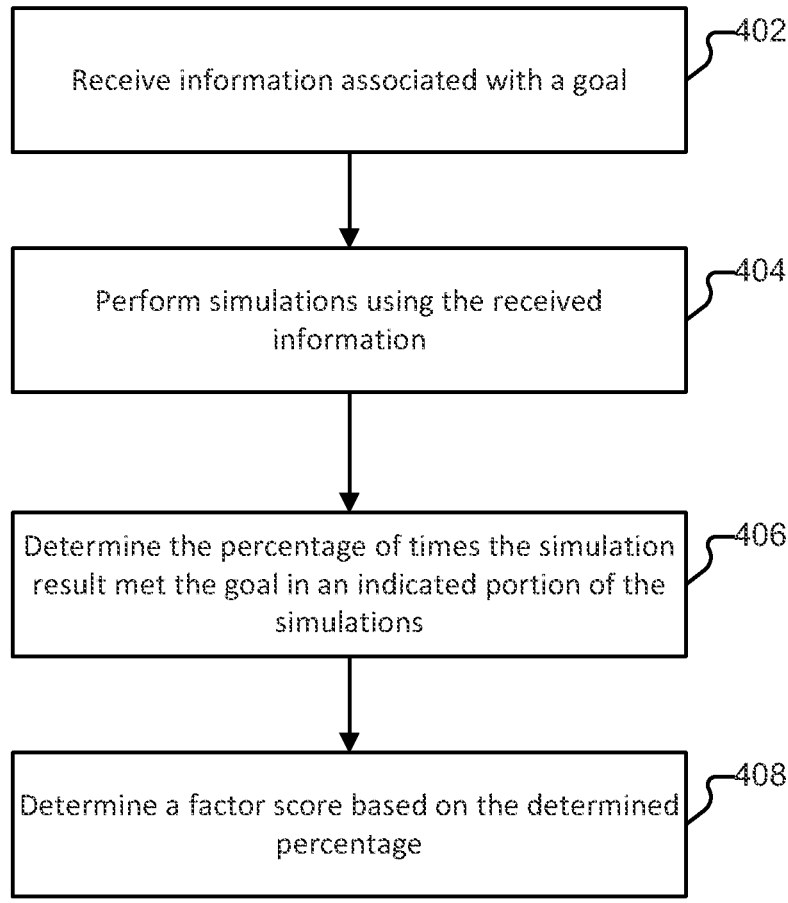
FIG. 4 is a flow chart illustrating an embodiment of a process for determining a factor score.

FIG. 4 is a flow chart illustrating an embodiment of a process for determining a factor score. In some embodiments, at least a portion of the process of FIG. 4 is included in 204 of FIG. 2. For example, at least a portion of the process of FIG. 4 is used to determine one or more factor scores for the associated factor(s) in 204 of FIG. 2. In some embodiments, the process of FIG. 4 is at least in part performed by server 102 of FIG. 1. At 402, information associated with a goal is received. In some embodiments, receiving the information associated with a goal includes receiving numerical value(s) associated with a financial goal, financial(s), and a desired time to achieve the goal. At 404, a simulation is performed using the received information. For example, a Monte Carlo simulation is performed at 404. In some embodiments, the simulation simulates future likelihood that the financial goal(s) will be met in a desired time frame. At 406, a percentage of times the simulation result achieved an indicated goal in a specified portion of the simulations is determined from the simulation. For example, the maximum percentage of times the financial goal(s) of a subject was met in 80% of the simulations is determined. At 408, a factor score based on the determined percentage is determined. For example, the factor score in 408 is determined at least in part by multiplying an associated maximum factor score by the determined percentage.

Figure 5:
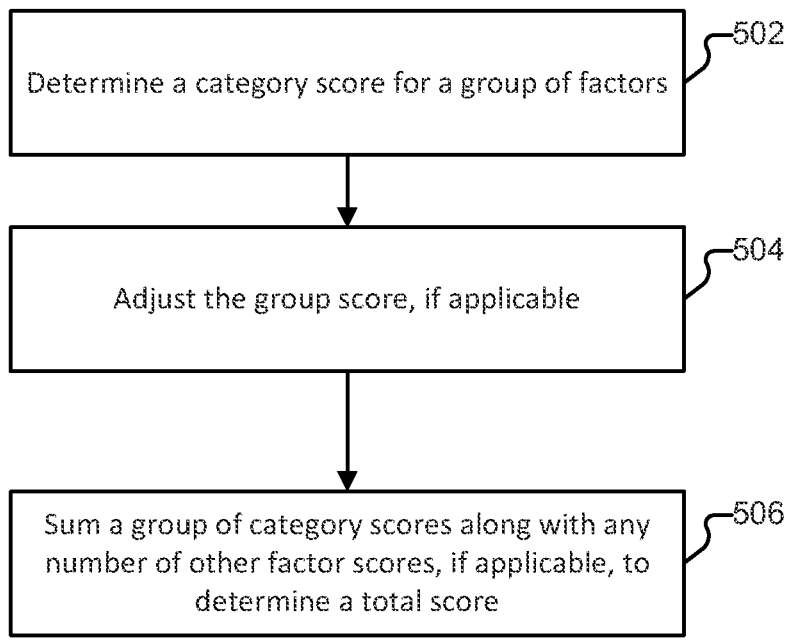
FIG. 5 is a flow chart illustrating an embodiment of a process for determining a financial evaluation score.

FIG. 5 is a flow chart illustrating an embodiment of a process for determining a financial evaluation score. In some embodiments, the process of FIG. 5 is included in 206 of FIG. 2. In some embodiments, the process of FIG. 5 is at least in part performed by server 102 of FIG. 1. At 502, a category score for a group of factors associated with the group is determined. For example, factor scores of group of factors are added together to determine the category score. Examples of categories includes goal setting factors, investments factors, debt optimization factors, protection planning factors, retirement factors, cash flow factors, estate planning factors, and tax factors. Detailed examples of factors included in these groups are provided later in the specification. At 504, the group score is adjusted, if applicable. In some embodiments, group score is adjusted using an adjustment value (e.g., a weighing multiplier, value to be subtracted, etc.) determined based on financial information of the subject to be scored. At 506, one or more category scores are summed together along with any number of other factor scores, if applicable, to determine a total score. In some embodiments, the total score is the total score of FIG. 2.

Figure 6:
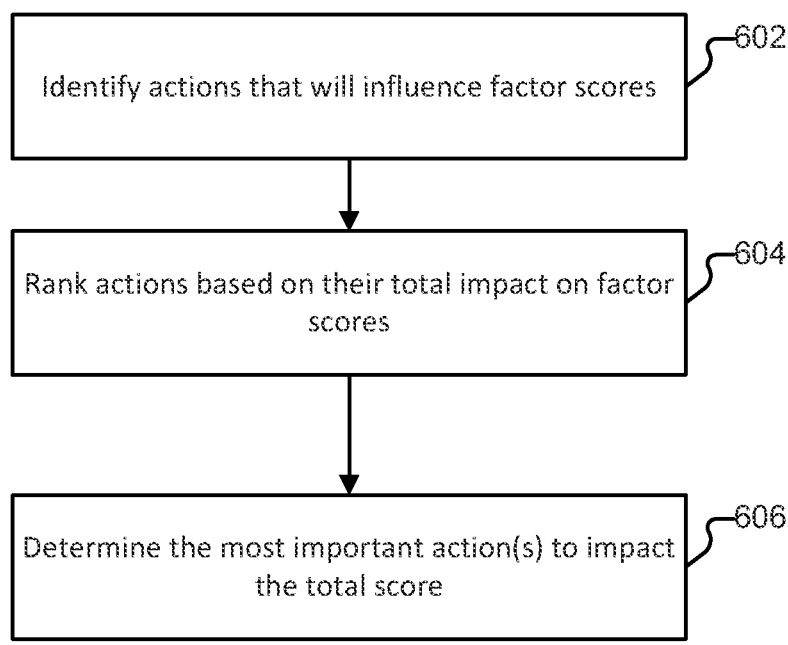
FIG. 6 is a flow chart illustrating an embodiment of a process for determining the most important action(s) that will impact a financial evaluation score.

FIG. 6 is a flow chart illustrating an embodiment of a process for determining the most important action(s) that will impact a financial evaluation score. In some embodiments, the process of FIG. 5 is included in 208 of FIG. 2. In some embodiments, 208 of FIG. 2 is included in 604 of FIG. 6. In some embodiments, the process of FIG. 6 is at least in part performed by server 102 of FIG. 1. At 602, actions that will influence the factor scores are identified. In some embodiments, factor scores are factor scores discussed along with FIG. 2. In some embodiments, identifying the actions includes identifying actions based on information provided by a subject. For example, information provided by a subject in order to determine a financial evaluation score is used to determine a set of actions that is more likely than other actions to improve the subject's financial evaluation score if implemented. In some embodiments, identifying the actions in 602 includes analyzing a group of potential actions to determine one or more of those potential actions that can improve the individual's financial evaluation score. In some embodiments, the actions of 602 are associated with a desired financial action/transaction indicated by the individual. At 604, the identified actions are ranked based on their total impact on the factor scores. For example, for each action, one or more factor scores that will be affected by achieving the action are identified and the value of the impact on those factor scores for the single action are added together to determine the total impact of the action. The actions are then ordered in an order associated with their total impact.

At 606, the most important action to impact the total score is determined. In some embodiments, determining the most important action includes determining an action that will have the largest potential to improve an individual's financial evaluation total score. In some embodiments, determining the most important action includes determining an action that will have the largest potential to improve an individual's financial evaluation total score, taking into account the associated difficulty of achieving the action. For example, the actions are sorted into groups of difficulty levels of achieving the action and the actions within each group are ranked according to their impact on the financial evaluation score.

In various embodiments, the most important action and/or the ranking of the actions are indicated to a user. For example, a user is provided a list of at least a portion of the identified actions of 602 ordered in the rank determined in 604. The most important action determined at 606 may be indicated to the user as the suggested next action item to accomplish. In some embodiments, for at least a portion of the actions indicated to the user, one or more assistance/tools/information/referrals useful in performing the action are provided along with the indicated actions.

ber of different score values, factors, factor scores, information and grouping may be used. In this example, the financial evaluation score includes two main groupings of factors, "Building the Nest" factors (financial planning and fundamental components, comprising 500 of the 1000 total points of the financial evaluation score) and the "Funding the Nest" factors (measurements of readiness of assets to achieve financial goal(s), comprising the rest of the 500 points).

The "Building the Nest" factors (500 points total) are grouped into the following categories of components: "Goal Setting" (50 points maximum), "Investments" (70 points maximum), "Debt Optimization" (50 points maximum), "Protection Planning" (70 points maximum), "Retirement Planning" (70 points maximum), "Cash Flow" (80 points maximum), "Estate Planning" (70 points maximum) and "Tax" (40 points maximum).

The factors and associated maximum factor scores (including how the factor score is determined for each of the factors) of the "Goal Setting" category are summarized in the chart below.

| Factor | Maximum Factor Score | How Factor Score is Determined |
|---|---|---|
| Identify financial goals (e.g., college, retirement, second home, wedding, purchase car, etc.) | 5* | Full score for identifying desired financial goal(s), zero score otherwise |
| List of Assets and Liabilities | 10* | Full score for identifying current assets and liabilities, zero score otherwise |
| Cost of goal(s) | 5* | Full score for identifying cost(s) associated with desired financial goal(s), zero score otherwise |
| Time period to achieve goal(s) | 5* | Full score for identifying desired time period to achieve desired financial goal(s), zero score otherwise |
| Complete risk tolerance survey (e.g., risk tolerance survey similar to ones offered by FinaMetrica Pty Limited to identify desired risk tolerance and investment tolerance) | 15* | Full score for completing the survey, zero score otherwise |
| Appropriate investment/saving vehicles considered and established? (e.g., checking account, money market account, certificates of deposit, mutual funds, savings account, stocks, bonds, annuities, IRA, 401(k) or other retirement plan, etc.) | 5* | Full score for having considered appropriate investment/savings vehicles, zero score otherwise |
| Identification of sources for funding (e.g., cash, retirement, savings, inheritance, etc.) financial goal(s). | 5* | Full score for researching and considering all indicated sources for funding financial goal(s), zero score otherwise |

*subject to scaling multiplier

Although scores associated with individuals have been discussed above, the processes and systems discussed in the specification can be used to determine a financial evaluation score for a couple, a family, or any group of individuals. For example, a score can be determined for each individual in the group and combined (e.g., averaged, scaled and added) and/or information associated with a plurality of individuals can be used in determining the sub score components.

An example of how to determine a financial evaluation score (i.e., total score) and its components (e.g., factor scores) is described below, along with a detailed example of how a financial evaluation score was determined for a hypothetical individual. These examples are merely illustrative. Any num- All of the factor scores in the category above are scaled by a liquidity scaling multiplier. If the total monthly expenses of at least three months can be covered with liquid assets (e.g., assets that can be converted to cash with little or no penalties within a few days), then the factor scores of the "Goal Setting" category above remain the same (i.e., multiplier of 1). However, if the total monthly expenses of only two months can be covered with liquid assets, then the factor scores of the "Goal Setting" category are reduced by 25% (i.e., multiplier of 0.75). If the total monthly expenses of only one month or less can be covered with liquid assets, then the factor scores of the "Goal Setting" category are reduced by 50%. For example, the factor scores above for the "Goal Setting" category are determined for a subject and these factor scores are added together to determine a group score. The group is reduced by 50% (i.e., multiplied by 0.5) if the individual's liquid assets can only cover one month of expenses.

The factors and associated maximum factor scores (including how the factor score is determined for each of the factors) of the "Investments" category are summarized in the chart below.

| Factor | Maximum Factor Score | How Factor Score is Determined |
|---|---|---|
| Making current contributions, net of withdrawals in the last 90 days, to meet financial goal(s) | 10* | Full score for contributing to a financial vehicle in order to achieve financial goal(s), zero score otherwise |
| Diversification of strategy | 10* | Full score if diversification of investment styles and types have been considered, zero score otherwise |
| Own non-correlated/alternatives as a portion of overall portfolio | 10* | Full score if at least two held investments do not have correlated returns, zero score otherwise |
| Auto-balance | 5* | Full score if held investments are re-balanced periodically to desired risk profile, zero score otherwise |
| Auto save | 5* | Full score if an automatic investment plan has been established, zero score otherwise |
| Liquidity needs consideration | 5* | Full score if liquidity needs have been considered with respect to investment strategies, zero score otherwise |
| Time horizon consideration | 5* | Full score if time horizons have been considered with respect to investment strategies, zero score otherwise |
| Types of investments (e.g., income, growth, real estate) consideration | 5* | Full score if different types of available investments have been considered with respect to investment strategies, zero score otherwise |
| Diversification of investment vehicles | 5* | Full score if diversification of assets has been accomplished (e.g., through the use of one or more vehicles such as mutual funds, exchange traded funds, or separately managed accounts), zero score otherwise |
| Tax consequences consideration | 5* | Full score if tax effects have been considered with respect to investment strategies, zero score otherwise |
| Dollar cost averaging consideration | 5* | Full score if dollar cost averaging investment strategy has been considered with respect to investment strategies, zero score otherwise. |

*subject to scaling multiplier

All of the factors scores for the "Investment" category above are scaled by a risk allocation scaling multiplier. The factor scores in this category are reduced if current investments are more or less risky than a recommended risk investment profile. Specifically, the scores are multiplied by the scaling multiplier=1−((difference between the recommended risk allocation and the current risk allocation)/(recommended risk allocation)). For example, if an individual has a recommended risk allocation of 50% and currently 55% of the investments are at risk, a factor score in this category is multiplied by the risk allocation scaling multiplier, which equals 90%=1−((55%−50%)/50%).

The factors and associated maximum factor scores (including how the factor score is determined for each of the factors) of the "Debt Optimization" category are summarized in the chart below.

| Factor | Maximum Factor Score | How Factor Score is Determined |
|---|---|---|
| Knowledge and identification of mortgage structure/mortgage | 5 | Full score for knowledge of different types of mortgages and the ability to identify the |

| Factor | Maximum Factor Score | How Factor Score is Determined |
|---|---|---|
| accelerated payoff options | | type of mortgage held, zero score otherwise |
| Knowledge of credit card usage optimization | 5 | Full score for knowledge of credit card mechanics and the ability to identify the details of currently held credit card, zero score otherwise |
| Knowledge of debt cost reduction strategies (e.g., strategies to lower interest rates, etc.) | 10 | Full score for knowledge of different types of debt cost reduction strategies, zero score otherwise |
| Review of credit score | 7 | Full score for knowledge of credit score, the reasons for the current score and how to improve the credit score, zero score otherwise. |
| Knowledge of lines of credit | 5 | Full score for knowledge of different types of lines of credit and identification of any lines of credit obtained, zero score otherwise |
| Knowledge of total liabilities | 8 | Full score for knowledge of the total value of current liabilities, zero score otherwise |
| Knowledge of options to improve other types of debt (e.g., auto loans, student loans and other secured and unsecured loans and lines of credit) | 10 | Full score for knowledge of options to improve other types of debt, zero score otherwise |

The factors and associated maximum factor scores (including how the factor score is determined for each of the factors) of the "Protection Planning" category are summarized in the chart below.

| Factor | Maximum Factor Score | How Factor Score is Determined |
|---|---|---|
| Life insurance needs met? | 15 | Factor Score = ((amount of current life insurance coverage)/(coverage needed to meet financial goal(s)) * maximum possible score |
| Disability insurance needs met? | 15 | Factor Score = ((amount of current disability insurance coverage)/(coverage needed to meet financial goal(s)) * maximum possible score |
| Long term care insurance needs met? | 8 | Factor Score = ((amount of current long term care insurance coverage)/(coverage needed to meet financial goal(s)) * maximum possible score |
| Knowledge and optimization of homeowners/renters insurance | 8 | Full score for sufficient knowledge and optimization of current homeowners/renters insurance plan, zero score otherwise |
| Knowledge and optimization of auto/boat/rv etc. insurance | 8 | Full score for sufficient knowledge and optimization of current vehicle insurance plan, zero score otherwise |
| Knowledge and optimization of health insurance | 10 | Full score for sufficient knowledge and optimization of current health insurance plan, zero score otherwise |
| Knowledge and optimization of umbrella/excess coverage policy | 6 | Full score for sufficient knowledge and optimization of current umbrella/excess coverage policy, zero score otherwise |

For the "Retirement Planning" category, two alternative sets of factors exist. One set of factors is for those who are not yet retired and another set of factors is for those that are currently retired. The factors and associated maximum factor scores (including how the factor score is determined for each of the factors) for the "Retirement Planning" category for those who are not yet retired are summarized below.

| Factor | Maximum Factor Score | How Factor Score is Determined |
|---|---|---|
| Contributing the recommend percentage of income to retirement? | 40 | Factor score = ((percent of income being contributed to retirement account)/ (recommend percentage of income to be contributed to retirement account)) * maximum possible score for this factor |
| Contributing to all possible types of retirement accounts? | 10 | Full score if contributing to all available types of retirement accounts, zero score otherwise |
| Employer match maximization | 8 | Full score if taking advantage of maximum retirement account contribution matching offered by employer, zero score otherwise |
| Pension availability and elections | 7 | Full score if sufficient knowledge about any pension available through employer and associated elections, zero score otherwise |
| Social security | 5 | Full score if sufficient knowledge about social security eligibility and associated benefits, zero score otherwise |

The other set of factors and associated maximum factor scores (including how the factor score is determined for each of the factors) for the "Retirement Planning" category for those who are currently retired are summarized below.

| Factor | Maximum Factor Score | How Factor Score is Determined |
|---|---|---|
| Living within retirement income means | 20 | Full score if expenses are equal to or less than the amount being withdrawn from retirement accounts, zero score otherwise |
| Withdrawing sustainable amount from retirement savings | 20 | Full score if the rate of amount being withdrawn from retirement accounts will last the projected retirement period, zero score otherwise |
| Total return vs. straight income | 10 | Full score if the two different retirement investment strategies were considered, zero score otherwise |
| Inflation considerations | 10 | Full score if inflation was considered in retirement planning, zero score otherwise |
| Life expectancy considerations | 10 | Full score if increased life expectancy was considered in retirement planning, zero score otherwise |

The factors and associated maximum factor scores (including how the factor score is determined for each of the factors) of the "Cash Flow" group are summarized in the chart below.

| Factor | Maximum Factor Score | How Factor Score is Determined |
|---|---|---|
| Monthly income enough to live current life style | 40 | Full score if monthly income is equal to or exceeds current expenses, zero score otherwise |
| Debt pay off plan | 20 | Full score if no debt or a plan to pay off debt is in place, zero score otherwise |
| Auto payment | 10 | Full score if automatic payment plan of expenses has been considered, zero score otherwise |
| Systematic saving | 10 | Full score if a systematic saving plan has been established, zero score otherwise |

The factors and associated maximum factor scores (including how the factor score is determined for each of the factors) of the "Estate Planning" group are summarized in the chart below.

| Factor | Maximum Factor Score | How Factor Score is Determined |
|---|---|---|
| When was the last time the estate plan was reviewed? | 5 | Full score for knowledge of last time when the estate plan was reviewed, zero score otherwise |
| Estate plan documents in place (e.g., will/trust, guardianship, executors/trustees, durables power of attorney, healthcare directive, etc.) | 30 | Full score for having appropriate estate planning documents in place, zero score otherwise |
| Beneficiary designation outside of estate planning documents | 12 | Full score for having considered beneficiary designation outside of estate planning documents, zero score otherwise |
| Special needs | 3 | Full score for having considered special needs in estate planning, zero score otherwise |
| Forms of property ownership as will substitute | 3 | Full score for having considered forms of ownership as estate planning, zero score otherwise |
| Charitable gifting | 3 | Full score for having considered charitable gifts in estate planning, zero score otherwise |
| Planning for liquidity | 3 | Full score for having considered liquidity in estate planning, zero score otherwise |
| Planning for incapacity | 3 | Full score for having considered incapacity in estate planning, zero score otherwise |
| Funeral arrangement contracts | 2 | Full score for having funeral arrangement contracts in place, zero score otherwise |
| Final instructions | 2 | Full score for having final instructions in place, zero score otherwise |
| Informational sheet (e.g., document with professional | 2 | Full score for having informational sheet in place, zero score otherwise |

-continued

| Factor | Maximum Factor Score | How Factor Score is Determined |
|---|---|---|
| emergency contacts, doctors, bank information, location & combinations for safe, etc.) | | |
| Location of hidden assets documented? | 2 | Full score for documenting locations of hidden assets, zero score otherwise |

The factors and associated maximum factor scores (including how the factor score is determined for each of the factors) of the "Tax" category are summarized in the chart below.

| Factor | Maximum Factor Score | How Factor Score is Determined |
|---|---|---|
| Tax refund status | 2 | Full score if can identify whether taxes were owed or refunded last tax year, zero score otherwise |
| W-4 withholding review | 2 | Full score reviewing tax withholding to determine if appropriate amount of taxes is being withheld from income, zero score otherwise |
| Retirement contributions - deductible or non-deductible | 5 | Full score reviewing tax status of retirement contributions, zero score otherwise |
| Maximized all tax shelters? | 5 | Full score for attempting to maximize tax shelters, zero score otherwise |
| Tax loss harvesting | 2 | Full score for analyzing tax loss harvesting, zero score otherwise |
| Deductions, credits, and extra | 15 | Full score for reviewing possible deductions, credits and other tax reduction opportunities, zero score otherwise |
| Accelerating deductions/ postponing income vs. accelerating income/ postponing deductions | 2 | Full score for considering acceleration strategies with respect to deductions/income for tax purposes, zero score otherwise |
| Gifting for estate planning reasons | 2 | Full score for considering tax considerations of gifting for estate planning purposes, zero score otherwise |
| Tax efficiency of debt & investment holdings | 3 | Full score for considering tax considerations of debt and investment holdings, zero score otherwise |
| Alternative Minimum Tax | 2 | Full score for considering alternative minimum tax, zero score otherwise |

Additionally, factors for the "Funding the Nest" factor group include the following factors in the following chart. The following chart also shows the corresponding maximum factor score and how the factor score is determined for the factor. If the formula shown in "How Factor Score is Determined" results in a score larger than the associated maximum factor score, the factor score of the associated factor is capped at the maximum factor score.

| Factor | Maximum Factor Score | How Factor Score is Determined |
|---|---|---|
| Flexibility/ Liquidity of assets being used to fund monthly income need | 50 | Factor score = (maximum score for this factor) * (percentage of assets that are liquid and that will be used to fund monthly income need in future) |
| Asset diversification (e.g., no more than 10% in any single asset used to fund financial goal(s)) | 100 | Factor score = (maximum score for this factor) * (percentage of assets that are not concentrated in one or more assets that represent more than 10% of total amount saved for financial goal(s)) |
| Amount accumulated to fund monthly income need | 100 | Factor score = (maximum score for this factor) * (percentage of assets necessary to achieve stated financial goal(s), currently (if retired) or going forward (if not yet retired)) |
| Monthly housing cost ratio (i.e., staying within 28% recommended limit spent on housing costs vs. income) (e.g., can be negative value) | 50 | Factor score = (maximum score for this factor) * (1 − ((monthly housing costs/ monthly gross income)/28%)) |
| Consumer debt ratio (i.e., staying within 20% recommended limit spent on debt costs vs. income) (e.g., can be negative value) | 50 | Factor score = (maximum score for this factor) * (1 − ((monthly debt costs/ monthly gross income)/28%)) |
| Trajectory of assets, given current contribution rate | 150 | Factor score = (maximum score for this factor) * (a percentage of time a simulation result achieved the financial goal(s) in an indicated portion of the simulations) [e.g, see process of FIG. 4] |

Below is an example calculation of a financial evaluation score for a hypothetical individual, Fred, using the examples of factors discussed above.

Fred is 44 years old and divorced with 2 children. His hopes to retire at age 60 with a net monthly income of $9,000 and wants to leave his two children at least $500,000 each. His finances are summarized in the chart below.

| Item | Amount |
|---|---|
| Gross monthly income | $15,000 |
| Monthly housing cost | $4,850 |
| Monthly consumer debt cost | $3,200 |
| Monthly savings | $500 |
| 401(k) account value | $125,000 |
| Roth IRA value | $2,000 |
| Brokerage account value | $5,000 |
| Home value | $750,000 |
| Mortgage balance | $850,000 |
| Life Insurance need/current coverage | $1.7 million/currently no policy |
| Disability insurance need/coverage | $8,000 per month/currently no policy |

Below is a chart summarizing Fred's factor scores for the "Goal Setting" category in the "Building the Nest" grouping.

| Factor | Factor Score | Reason for the Factor Score |
|---|---|---|
| Identify financial goals (e.g., college, retirement, second home, wedding, purchase car, etc.) | 5 out of 5* | Identified desired financial goals |
| List of Assets and Liabilities | 10 out of 10* | Identified current assets and liabilities |
| Cost of goal(s) | 0 out of 5* | Not able to identify costs associated with desired financial goals |
| Time period to achieve goal(s) | 5 out of 5* | Identified desired time period to achieve desired financial goals |
| Complete risk tolerance survey (e.g., risk tolerance survey similar to ones offered by FinaMetrica Pty Limited to identify desired risk tolerance and investment tolerance) | 15 out of 15* | Completed the risk tolerance survey |
| Appropriate investment/saving vehicles considered and established? (e.g., checking account, money market account, certificates of deposit, mutual funds, savings account, stocks, bonds, annuities, IRA, 401(k) or other retirement plan, etc.) | 0 out of 5* | Has not considered appropriate investment/ savings vehicles |
| Identification of sources for funding (e.g., cash, retirement, savings, inheritance, etc.) financial goal(s). | 0 out of 5* | Did not research and consider all indicated sources for funding financial goals |

*subject to scaling multiplier

The total of the "Goal Setting" factors above before scaling is 35. However, Fred cannot cover his total monthly expenses with liquid assets and consequently his liquidity scaling multiplier is 50%. Thus his score for the "Goal Setting" category is (0.5)(35)=17.5 out of 50. However, for the above factors that Fred has received zero, Fred would be provided with an opportunity to increase his factor score using provided information/tools/guidance/referrals (e.g., see the process of FIG. 3).

Below is a chart summarizing Fred's factor scores for the "Investments" category in the "Building the Nest" grouping.

| Factor | Factor Score | Reason for the Factor Score |
|---|---|---|
| Making current contributions, net of withdrawals in the last 90 days, to meet financial goal(s) | 10 out of 10* | Contributed to a financial vehicle in order to achieve financial goals |
| Diversification of strategy | 0 out of 10* | Diversification of investment styles and types have not been considered |
| Own non-correlated/alternatives as a portion of overall portfolio | 0 out of 10* | Investment held in single stock |
| Auto-balance | 0 out of 5* | Investments are not re-balanced periodically to desired risk profile |
| Auto save | 0 out of 5* | No automatic investment plan |
| Liquidity needs consideration | 5 out of 5* | Liquidity needs have been considered with respect to investment strategies |
| Time horizon consideration | 5 out of 5* | Time horizons have been considered with respect to investment strategies |
| Types of investments (e.g., income, growth, real estate) | 0 out of 5* | Different types of available investments have not been considered with respect to investment strategies |
| Diversification of investment vehicles | 0 out of 5* | Diversification of assets has not been accomplished |
| Tax consequences consideration | 0 out of 5* | Tax effects have not been considered with respect to investment strategies |
| Dollar cost averaging consideration | 5 out of 5* | Dollar cost averaging investment strategy has been considered with respect to investment strategies |

*subject to scaling multiplier

The total of the "Investment" factors above before scaling is 25. Although Fred has a recommended risk allocation of 70%, Fred has a current risk allocation of 100% because all of his investments are in a single risky stock. His risk allocation scaling multiplier is thus=1−((difference between the recommended risk allocation and the current risk allocation)/(recommended risk allocation))=1−((100%−70%)/70%)=1−43%=57%. Thus his score for the "Investment" category is (0.57)(25)=14.25 out of 70.

Below is a chart summarizing Fred's factor scores for the "Debt Optimization" category in the "Building the Nest" grouping.

| Factor | Factor Score | Reason for the Factor Score |
|---|---|---|
| Knowledge and identification of mortgage structure/ mortgage accelerated payoff options | 0 out of 5 | Incomplete knowledge of different types of mortgages and inability to identify the type of mortgage held |
| Knowledge of credit card usage optimization | 5 out of 5 | Knowledge of credit card mechanics and the ability to identify the details of currently held credit card |
| Knowledge of debt cost reduction strategies (e.g., strategies to lower interest rates, etc.) | 10 out of 10 | Knowledge of different types of debt cost reduction strategies |
| Review of credit score | 0 out of 7 | Does not know credit score |
| Knowledge of lines of credit | 5 out of 5 | Knowledge of different types of lines of credit and no lines of credit obtained |
| Knowledge of total liabilities | 8 out of 8 | Knowledge of the total value of current liabilities |
| Knowledge of options to improve other types of debt (e.g., auto loans, student loans and other secured and unsecured loans and lines of credit) | 0 out of 10 | Incomplete knowledge of options to improve other types of debt |

The total of the "Debt Optimization" factor scores is 28 out of 50.

Below is a chart summarizing Fred's factor scores for the "Protection Planning" category in the "Building the Nest" grouping.

| Factor | Factor Score | Reason for the Factor Score |
|---|---|---|
| Life insurance needs met? | 0 out of 15 | No life insurance but need exists |

-continued

| Factor | Factor Score | Reason for the Factor Score |
|---|---|---|
| Disability insurance needs met? | 0 out of 15 | No disability insurance but need exists |
| Long term care insurance needs met? | 0 out of 8 | No long term insurance but need exists |
| Knowledge and optimization of homeowners/renters insurance | 8 out of 8 | Sufficient knowledge and optimization of current homeowners/renters insurance plan |
| Knowledge and optimization of auto/boat/rv etc. insurance | 8 out of 8 | Sufficient knowledge and optimization of current vehicle insurance plan |
| Knowledge and optimization of health insurance | 10 out of 10 | Sufficient knowledge and optimization of current health insurance plan |
| Knowledge and optimization of umbrella/excess coverage policy | 0 out of 6 | Insufficient knowledge and optimization of current umbrella/excess coverage policy |

The total of the "Protection Planning" factor scores is 26 out of 70.

For the "Retirement Planning" category, because Fred has not retired yet, the set of factors for those that are not currently retired is used. Below is a chart summarizing Fred's factor scores for the "Retirement Planning" category in the "Building the Nest" grouping.

| Factor | Factor Score | Reason for the Factor Score |
|---|---|---|
| Contributing the recommend percentage of income to retirement? | 12 out of 40 | Factor score = (3%/10%) * 40 |
| Contributing to all possible types of retirement accounts? | 0 out of 10 | Not contributing to all available types of retirement accounts |
| Employer match maximization | 0 out of 8 | Not taking advantage of maximum retirement account contribution matching offered by employer |
| Pension availability and elections | 7 out of 7 | Sufficient knowledge about any pension available through employer and associated elections |
| Social security | 5 out of 5 | Sufficient knowledge about social security eligibility and associated benefits |

The total of the "Retirement Planning" factor scores is 24 out of 70.

Below is a chart summarizing Fred's factor scores for the "Cash Flow" category in the "Building the Nest" grouping.

| Factor | Factor Score | Reason for the Factor Score |
|---|---|---|
| Monthly income enough to live current life style | 0 out of 40 | Monthly income less than current monthly expenses |
| Debt pay off plan | 20 out of 20 | Debt payment plan in place |
| Auto payment | 10 out of 10 | Automatic payment plan of expenses has been considered |
| Systematic saving | 10 out of 10 | Systematic saving plan has been established |

The total of the "Cash Flow" factor scores is 40 out of 80.

Below is a chart summarizing Fred's factor scores for the "Estate Planning" category in the "Building the Nest" grouping.

| Factor | Factor Score | Reason for the Factor Score |
|---|---|---|
| When was the last time the estate plan was reviewed? | 0 out of 5 | No knowledge of last time when the estate plan was reviewed |
| Estate plan documents in place (e.g., will/trust, guardianship, executors/trustees, durables power of attorney, healthcare directive, etc.) | 30 out of 30 | Appropriate estate planning documents in place |
| Beneficiary designation outside of estate planning documents | 12 out of 12 | Considered beneficiary designation outside of estate planning documents |
| Special needs | 3 out of 3 | Considered special needs in estate planning |
| Forms of property ownership as will substitute | 3 out of 3 | Considered forms of ownership as estate planning |
| Charitable gifting | 3 out of 3 | Considered charitable gifts in estate planning |
| Planning for liquidity | 3 out of 3 | Considered liquidity in estate planning |
| Planning for incapacity | 0 out of 3 | Did not consider incapacity in estate planning |
| Funeral arrangement contracts | 0 out of 2 | Funeral arrangement contracts not in place |
| Final instructions | 0 out of 2 | Final instructions not in place |
| Informational sheet (e.g., document with professional emergency contacts, doctors, bank information, location & combinations for safe, etc.) | 0 out of 2 | Informational sheet not in place |
| Location of hidden assets documented? | 2 out of 2 | Locations of hidden assets documented |

The total of the "Estate Planning" factor scores is 56 out of 70.

Below is a chart summarizing Fred's factor scores for the "Tax" category in the "Building the Nest" grouping.

| Factor | Factor Score | Reason for the Factor Score |
|---|---|---|
| Tax refund status | 2 out of 2 | Could identify whether taxes were owed or refunded last tax year |
| W-4 withholding review | 2 out of 2 | Reviewed tax withholding to determine if appropriate amount of taxes is being withheld from income |
| Retirement contributions - deductible or non-deductible | 5 out of 5 | Reviewed tax status of retirement contributions |
| Maximized all tax shelters? | 5 out of 5 | Attempted to maximize tax shelters |
| Tax loss harvesting | 2 out of 2 | Analyzing tax loss harvesting |
| Deductions, credits, and extra | 15 out of 15 | Reviewing possible deductions, credits and other tax reduction opportunities |
| Accelerating deductions/postponing income vs. accelerating income/postponing deductions | 2 out of 2 | Considered acceleration strategies with respect to deductions/income for tax purposes |
| Gifting for estate planning reasons | 2 out of 2 | Considered tax considerations of gifting for estate planning purposes |

-continued

| Factor | Factor Score | Reason for the Factor Score |
|---|---|---|
| Tax efficiency of debt & investment holdings | 0 out of 3 | Did not consider tax considerations of debt and investment holdings |
| Alternative Minimum Tax | 0 out of 2 | Did not consider alternative minimum tax strategies |

The total of the "Tax" factor scores is 35 out of 40.

Thus the combined scores for the "Building the Nest" factors is 240.75

Additionally, factors for the "Funding the Nest" factor group include the following factors.

| Factor | Factor Score | Reason for the Factor Score |
|---|---|---|
| Flexibility/Liquidity of assets being used to fund monthly income need | 50 out of 50 | Factor score = (maximum score for this factor) * (percentage of assets that are liquid and that will be used to fund monthly income need in future) = 50 * 100% |
| Asset diversification (e.g., no more than 10% in any single asset used to fund financial goal(s)) | 50 out of 100 | Factor score = (maximum score for this factor) * (percentage of assets that are not concentrated in one or more assets that represent more than 10% of total amount saved for financial goal(s)) = 100 * 50% |
| Amount accumulated to fund monthly income need | 5 out of 100 | Factor score = (maximum score for this factor) * (percentage of assets necessary to achieve stated financial goal(s), currently (if retired) or going forward (if not yet retired)) = 100 * 5% |
| Monthly housing cost ratio (i.e., staying within 28% recommended limit spent on housing costs vs. income) (e.g., can be negative value) | −4.52 out of 50 | Factor score = (maximum score for this factor) * (1 − ((monthly housing costs/monthly gross income)/28%)) = 50 * (1 − (($4,580/$15,000)/28%)) |
| Consumer debt ratio (i.e., staying within 20% recommended limit spent on debt costs vs. income) (e.g., can be negative value) | −3.33 out of 50 | Factor score = (maximum score for this factor) * (1 − ((monthly debt costs/monthly gross income)/20%)) = 50 * (1−(($3,200/$15,000)/20%)) |
| Trajectory of assets, given current contribution rate | 34.5 out of 150 | Factor score = (maximum score for this factor) * (a percentage of time a simulation result achieved the financial goal(s) in 80% of the simulations) = 150 * 23% |

Thus the combined scores for the "Funding the Nest" factors is 131.65 and the combined total financial evaluation score is 372.4 or rounded to 372.

After receiving the financial evaluation score of 372, Fred is presented with opportunities to improve his score. For example, using the process of FIG. 6, Fred is presented with a list of recommendations. The most important action to improve his score has been identified as increasing his annual savings by at least $18,000, which would improve his financial evaluation score by 58 points. Other actions presented to Fred include (in order of priority), adjusting his retirement time horizon (32 point increase in score), beginning a debt reduction plan (25 point increase in score), obtaining sufficient life insurance (12 point increase in score), among other suggested actions.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of quantitatively improving a financial evaluation, comprising:
   determining a plurality of factor scores based on a plurality of factors;
   using a processor to calculate a total score based on the plurality of factor scores;
   identifying a plurality of actions that will influence at least a portion of the plurality of factor scores;
   ranking the actions based on their total impact on the plurality of factor scores; and
   determining a most important action of the plurality of actions to improve the total score;
   wherein at least one of the factor scores is determined by assigning a maximum score value to the at least one factor score if a subject of the total score has provided a requested information used to determine another factor score.

2. The method of claim 1, wherein the total score is correlated with a progress of achieving an identified financial goal of the subject.

3. The method of claim 1, wherein the plurality of actions are actions that when executed can potentially affect the total score.

4. The method of claim 1, wherein the plurality of actions is associated with a desired financial action of the subject evaluated using the total score.

5. The method of claim 1, wherein determining the plurality of factor scores includes analyzing information provided via the Internet.

6. The method of claim 1, wherein at least one of the factor scores identifies whether the subject of the total score has sufficient knowledge related to a factor included in the plurality of factors.

7. The method of claim 6, wherein at least one of the actions is associated with providing education associated with the factor included in the plurality of factors.

8. The method of claim 1, wherein at least one of the factor scores is decayed based on a length of time since a time associated with the at least one factor score.

9. The method of claim 1, wherein at least one of the factor scores is determined at least in part by performing a simulation to determine a likelihood that a financial goal will be met within a specified time frame.

10. The method of claim 1, wherein the most important action is an action included in the plurality of actions that will improve the total score the most as compared to other actions in the plurality of actions.

11. The method of claim 1, wherein the total score is associated with a financial position of a plurality of individuals.

12. A system for quantitatively improving a financial evaluation, comprising:
   a processor configured to:
      determine a plurality of factor scores based on a plurality of factors;

calculate a total score based on the plurality of factor scores;

identify a plurality of actions that will influence at least a portion of the plurality of factor scores;

rank the actions based on their total impact on the plurality of factor scores; and determine a most important action of the plurality of actions to improve the total score; and a memory coupled to the processor and configured to provide the processor with instructions;

wherein at least one of the factor scores is determined by assigning a maximum score value to the at least one factor score if a subject of the total score has provided a requested information used to determine another factor score.

13. The system of claim 12, wherein the total score is correlated with a progress of achieving an identified financial goal of the subject.

14. The system of claim 12, wherein at least one of the factor scores identifies whether the subject of the total score has sufficient knowledge related to a factor included in the plurality of factors.

15. The system of claim 12, wherein at least one of the factor scores is decayed based on a length of time since a time associated with the at least one factor score.

16. The system of claim 12, wherein at least one of the factor scores is determined at least in part by performing a simulation to determine a likelihood that a financial goal will be met within a specified time frame.

17. A computer program product for quantitatively improving a financial evaluation, the computer program product being embodied in a tangible computer readable storage medium and comprising computer instructions for:

determining a plurality of factor scores based on a plurality of factors;

calculating a total score based on the plurality of factor scores;

identifying a plurality of actions that will influence at least a portion of the plurality of factor scores;

ranking the actions based on their total impact on the plurality of factor scores; and determining a most important action of the plurality of actions to improve the total score;

wherein at least one of the factor scores is determined by assigning a maximum score value to the at least one factor score if a subject of the total score has provided a requested information used to determine another factor score.

18. The computer program product of claim 17, wherein the total score is correlated with a progress of achieving an identified financial goal of the subject.

19. The computer program product of claim 17, wherein at least one of the factor scores identifies whether the subject of the total score has sufficient knowledge related to a factor included in the plurality of factors.

20. The computer program product of claim 17, wherein at least one of the factor scores is determined at least in part by performing a simulation to determine a likelihood that a financial goal will be met within a specified time frame.

* * * * *